United States Patent
Lim

(10) Patent No.: US 9,538,059 B2
(45) Date of Patent: Jan. 3, 2017

(54) MOBILE TERMINAL AND CONTROL METHOD THEREOF

(71) Applicant: LG ELECTRONICS INC., Seoul (KR)

(72) Inventor: Dachan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 14/295,079

(22) Filed: Jun. 3, 2014

(65) Prior Publication Data

US 2015/0049211 A1 Feb. 19, 2015

(30) Foreign Application Priority Data

Aug. 19, 2013 (KR) .................. 10-2013-0098043

(51) Int. Cl.
*H04N 5/232* (2006.01)
*H04N 5/235* (2006.01)
*H04N 5/247* (2006.01)

(52) U.S. Cl.
CPC .......... *H04N 5/23203* (2013.01); *H04N 5/235* (2013.01); *H04N 5/23229* (2013.01); *H04N 5/23293* (2013.01); *H04N 5/247* (2013.01)

(58) Field of Classification Search
CPC H04N 5/23203; H04N 5/247; H04N 5/23229; H04N 5/23293; H04N 9/735; H04N 5/235–5/243; G03B 7/0993; G03B 7/09978; G03B 7/00–7/28; G03B 9/58–9/62; G03B 2207/00–2207/005
See application file for complete search history.

(56) References Cited

U.S. PATENT DOCUMENTS

| | | | | |
|---|---|---|---|---|
| 5,353,058 A * | 10/1994 | Takei | ............... | H04N 5/238 348/362 |
| 6,516,154 B1 * | 2/2003 | Parulski | ............... | H04N 5/225 348/333.01 |
| 6,816,156 B2 * | 11/2004 | Sukeno | ............... | G09G 5/10 345/204 |
| 7,626,612 B2 * | 12/2009 | John | ............... | H04N 5/23248 348/208.4 |
| 7,724,296 B2 * | 5/2010 | Lonn | ............... | G06K 9/00248 348/207.99 |
| 7,764,320 B1 * | 7/2010 | Salvato | ............... | G06K 7/10881 348/344 |
| 7,817,187 B2 * | 10/2010 | Silsby | ............... | G11B 31/006 348/208.6 |
| 7,860,382 B2 * | 12/2010 | Grip | ............... | G02B 7/287 348/333.03 |

(Continued)

FOREIGN PATENT DOCUMENTS

EP 1 280 336 A2 1/2003
KR 10-2013-0043990 A 5/2013

*Primary Examiner* — Aung S Moe
(74) *Attorney, Agent, or Firm* — Birch, Stewart, Kolasch & Birch, LLP

(57) ABSTRACT

A mobile terminal including a wireless communication unit configured to perform wireless communication; a main body having first and second cameras facing in different directions; a display unit configured to display an image captured by the first camera; and a controller configured to activate the second camera when an image compensation mode is set on the mobile terminal, compensate the image using an amount of light entering the first and second cameras, and display the compensated image on the display unit.

19 Claims, 16 Drawing Sheets

(56) References Cited

U.S. PATENT DOCUMENTS

| | | | | |
|---|---|---|---|---|
| 8,013,908 B2* | 9/2011 | Chou | H04N 9/735 | 348/223.1 |
| 8,520,080 B2* | 8/2013 | Havens | H04N 5/2258 | 235/440 |
| 8,619,151 B2* | 12/2013 | Park | H04N 5/262 | 348/222.1 |
| 8,682,391 B2* | 3/2014 | Lee | H04M 1/72563 | 455/457 |
| 8,731,612 B2* | 5/2014 | Mun | H04M 1/72572 | 348/14.01 |
| 8,922,673 B2* | 12/2014 | Zhao | H04N 1/6027 | 348/223.1 |
| 8,964,062 B1* | 2/2015 | Neglur | H04N 5/235 | 348/230.1 |
| 9,041,645 B2* | 5/2015 | Plaehn | G06F 3/013 | 345/156 |
| 9,131,150 B1* | 9/2015 | Mangiat | H04N 5/2352 | |
| 9,167,147 B2* | 10/2015 | Plaehn | H04N 5/23212 | |
| 9,247,223 B2* | 1/2016 | McCrackin | H04N 9/735 | |
| 9,253,434 B2* | 2/2016 | Boss | H04N 5/23229 | |
| 9,269,009 B1* | 2/2016 | Liu | G06K 9/18 | |
| 9,307,151 B2* | 4/2016 | Son | H04N 5/23293 | |
| 2005/0036044 A1* | 2/2005 | Funakura | G06K 9/00228 | 348/239 |
| 2005/0271379 A1* | 12/2005 | Lee | H04N 5/2351 | 396/234 |
| 2006/0170769 A1* | 8/2006 | Zhou | G06K 9/00362 | 348/143 |
| 2007/0070204 A1* | 3/2007 | Mentzer | H04N 5/2251 | 348/207.99 |
| 2007/0223908 A1* | 9/2007 | Sakamoto | H04N 5/2351 | 396/234 |
| 2008/0122821 A1* | 5/2008 | Nilsson | G03B 17/20 | 345/207 |
| 2008/0231726 A1* | 9/2008 | John | H04N 9/735 | 348/223.1 |
| 2008/0231729 A1* | 9/2008 | Sato | G06T 3/4053 | 348/229.1 |
| 2008/0284901 A1* | 11/2008 | Misawa | G02B 7/36 | 348/349 |
| 2009/0040170 A1* | 2/2009 | Nilsson | H04N 5/58 | 345/101 |
| 2009/0160970 A1* | 6/2009 | Fredlund | H04N 5/232 | 348/229.1 |
| 2010/0033588 A1* | 2/2010 | Thorn | H04N 5/2354 | 348/222.1 |
| 2010/0039530 A1* | 2/2010 | Guo | H04N 5/2351 | 348/231.99 |
| 2010/0134652 A1* | 6/2010 | Takane | H04N 5/2258 | 348/229.1 |
| 2010/0149372 A1* | 6/2010 | Silverstein | H04N 5/2258 | 348/223.1 |
| 2010/0245617 A1* | 9/2010 | Shuster | H04N 9/735 | 348/223.1 |
| 2011/0050937 A1* | 3/2011 | Huang | G03B 15/03 | 348/222.1 |
| 2011/0164105 A1* | 7/2011 | Lee | H04N 7/142 | 348/14.02 |
| 2011/0187811 A1* | 8/2011 | Kim | H04N 5/225 | 348/14.01 |
| 2011/0267492 A1* | 11/2011 | Prentice | G03B 7/08 | 348/223.1 |
| 2011/0298886 A1* | 12/2011 | Price | H04N 5/2351 | 348/14.08 |
| 2012/0100888 A1* | 4/2012 | Kim | H04M 1/72569 | 455/556.1 |
| 2012/0120186 A1* | 5/2012 | Diaz | H04N 5/2258 | 348/36 |
| 2012/0135783 A1* | 5/2012 | Sams | G06T 15/60 | 455/556.1 |
| 2012/0162379 A1* | 6/2012 | Dahi | H04N 5/23254 | 348/47 |
| 2012/0196649 A1* | 8/2012 | Havens | H04N 5/2258 | 455/556.1 |
| 2012/0268552 A1* | 10/2012 | Choi | H04N 7/147 | 348/14.07 |
| 2013/0044233 A1* | 2/2013 | Bai | H04N 5/23219 | 348/222.1 |
| 2013/0128075 A1* | 5/2013 | Lukac | H04N 5/2353 | 348/229.1 |
| 2013/0135445 A1* | 5/2013 | Dahi | H04N 13/0203 | 348/47 |
| 2013/0181960 A1* | 7/2013 | Kim | G09G 5/10 | 345/207 |
| 2013/0208140 A1 | 8/2013 | Quast et al. | | |
| 2013/0235224 A1* | 9/2013 | Park | H04N 5/23222 | 348/218.1 |
| 2014/0063288 A1* | 3/2014 | Suh | H04N 5/2353 | 348/229.1 |
| 2014/0232904 A1* | 8/2014 | Na | H04N 5/23229 | 348/239 |
| 2014/0270357 A1* | 9/2014 | Hampiholi | G06T 7/0085 | 382/103 |
| 2014/0300704 A1* | 10/2014 | Ramaswamy | G06T 7/002 | 348/48 |
| 2015/0077323 A1* | 3/2015 | Ramaswamy | G06F 3/012 | 345/156 |
| 2015/0091903 A1* | 4/2015 | Costello | G06T 15/20 | 345/426 |
| 2015/0201130 A1* | 7/2015 | Cho | H04N 5/23293 | 348/333.05 |
| 2015/0213303 A1* | 7/2015 | Jain | G06K 9/00255 | 382/118 |

* cited by examiner

MOBILE TERMINAL AND CONTROL METHOD THEREOF

CROSS-REFERENCE TO A RELATED APPLICATION

Pursuant to 35 U.S.C. §119(a), this application claims the benefit of earlier filing date and right of priority to Korean Application No. 10-2013-0098043, filed on Aug. 19, 2013, the contents of which is incorporated by reference herein in its entirety.

BACKGROUND OF THE INVENTION

1. Field of the Invention

The present invention relates to a mobile terminal which includes a camera and compensates an image captured by the camera, and a control method thereof.

2. Background of the Invention

In general, a terminal may be classified into a mobile (portable) terminal and a stationary terminal. The mobile terminal may be also classified into a handheld terminal and a vehicle mounted terminal.

As functions of the terminal become more diversified, the terminal can support more complicated functions such as capturing images or video, reproducing music or video files, playing games and receiving broadcast signals. By comprehensively and collectively implementing such functions, the mobile terminal can be embodied in the form of a multimedia player or a device.

A mobile terminal includes a camera, and can display a moving image or still image of a subject captured by the camera on a display unit or store it in a memory or transmit a captured image screen to the outside. Also, the mobile terminal including the camera includes a zoom function to enlarge and reduce images shot at the time of image shooting.

The camera included in the mobile terminal uses a CCD (Charge Coupled Device), CMOS (Complementary Metal Oxide Semiconductor), etc. as an image pickup device, and may include an AE (Auto Exposure) function that adjusts the amount of light in shot images. The AE function lets the camera calculate the average luminance value of a certain part of a shooting screen. Also, the aperture or shutter speed of the camera can be changed depending on whether or not the average luminance value is beyond a given critical range, and accordingly the amount of light in shot images can be adjusted.

Meanwhile, a shot image may be different from what the user intends, depending on the characteristics of a light source reflected on the subject. For example, the face may look dark in a backlighting situation or too bright making it difficult to see the outline of the subject in a front-lighting situation.

It is also difficult for the user to use a mobile terminal that can achieve steady results of image shooting, even with changes in light source.

SUMMARY OF THE INVENTION

Therefore, an aspect of the detailed description is to provide a mobile terminal which compensates an image captured by a camera according to the characteristics of a light source, and a control method thereof.

To achieve these and other advantages and in accordance with the purpose of this specification, as embodied and broadly described herein, there is provided a mobile terminal according to an embodiment of the present invention, the mobile terminal including; a main body having first and second cameras facing in different directions; a display unit that outputs an image captured by the first camera; and a controller that activates the second camera when the compensation mode is executed on the image, compensates the image by using the amount of light entering the first and second cameras, and outputs the compensated image to the display unit.

In one embodiment, the controller calculates the location of a light source by using the amount of light entering the first and second cameras, and compensates the image based on the calculated location.

In one embodiment, the controller compensates image noise in the image which appears in different forms depending on the location of the light source.

In one embodiment, if the light source front-lights the first camera, the controller compensates a shadow in the image which is cast by the main body.

In one embodiment, if the light source backlights the first camera, the controller detects a region including a human face from the image, and compensates the image so that the detected region has a predetermined brightness level.

In one embodiment, the controller changes the shooting mode of the first camera depending on the calculated location, and the image is compensated according to the changed shooting mode.

In one embodiment, the shooting mode is the settings associated with at least one of the following: ISO sensitivity, white balance, flash, shutter speed, and aperture.

In one embodiment, if the calculated location of the light source satisfies a predetermined condition, the controller outputs guidance information on the display unit to help change the direction where the first camera faces, depending on the calculated location of the light source.

In one embodiment, if first and second images captured by the first and second cameras are output to the display unit, the compensation mode is executed, and the controller compensates at least one of the first and second images by using the amount of light entering the first and second cameras and outputs at least one compensated image on the display unit.

In one embodiment, the controller calculates the average luminance values of the first and second images and compensates at least one of the first and second images so that the difference between the average luminance values satisfies limiting criteria.

In one embodiment, if the first camera is a front camera on the front of the main body, the compensation mode is executed simultaneously with the activation of the first camera.

In one embodiment, the controller analyzes the shooting location using the pattern of an image captured by the second camera and compensates the image by using the amount of light entering the first and second cameras according to the analyzed shooting location.

In one embodiment, the scene mode of the first camera is set to indoors or outdoors according to the analyzed shooting location.

In one embodiment, the controller analyzes the type of the light source using the pattern of an image captured by the second camera and changes the white balance of the first camera according to the analyzed type.

Furthermore, there is provided a control method of a mobile terminal according to an embodiment of the present invention, the control method including the steps of outputting an image captured by a first camera to a display unit;

when the compensation mode is executed on the image, activating a second camera facing in a different direction from the first camera; and compensating the image by using the amount of light entering the first and second cameras and outputting the compensated image to the display unit.

In one embodiment, in the step of outputting the compensated image, the location of a light source is calculated by using the amount of light entering the first and second cameras, and the image is compensated based on the calculated location.

In one embodiment, image noise in the image, which appears in different forms depending on the location of the light source, is compensated.

In one embodiment, the step of outputting the compensated image includes the steps of: detecting a region including a human face from the image; and compensating the image based on the calculated location so that the detected region has a predetermined brightness level.

In one embodiment, the control method of the mobile terminal may further include the steps of: if the calculated location satisfies a predetermined condition, outputting guidance information on the display unit to help change the direction where the first camera faces, depending on the calculated location.

In one embodiment, in the step of outputting the compensated image, the shooting mode of the first camera is changed depending on the calculated location, and the shooting mode is the settings associated with at least one of the following: ISO sensitivity, white balance, flash, shutter speed, and aperture.

The mobile terminal according to the present invention enables more accurate analysis of the characteristics of the light source and helps to achieve steady results of shootings, even with various changes in light source, because an image captured by the first camera can be compensated by using the amount of light entering the first and second cameras.

Moreover, the mobile terminal according to the embodiment of the present invention is capable of providing the best images to the user because image noise, which appears in different forms depending on the characteristics of the light source, can be compensated in various ways by hardware and software. Since the user can make use of auto-compensated images, convenience can be improved.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The mobile terminal according to an embodiment of the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, the present invention may be also applicable to a fixed terminal such as a digital TV and a desktop computer, except for specific configurations for mobility.

Figure 1:
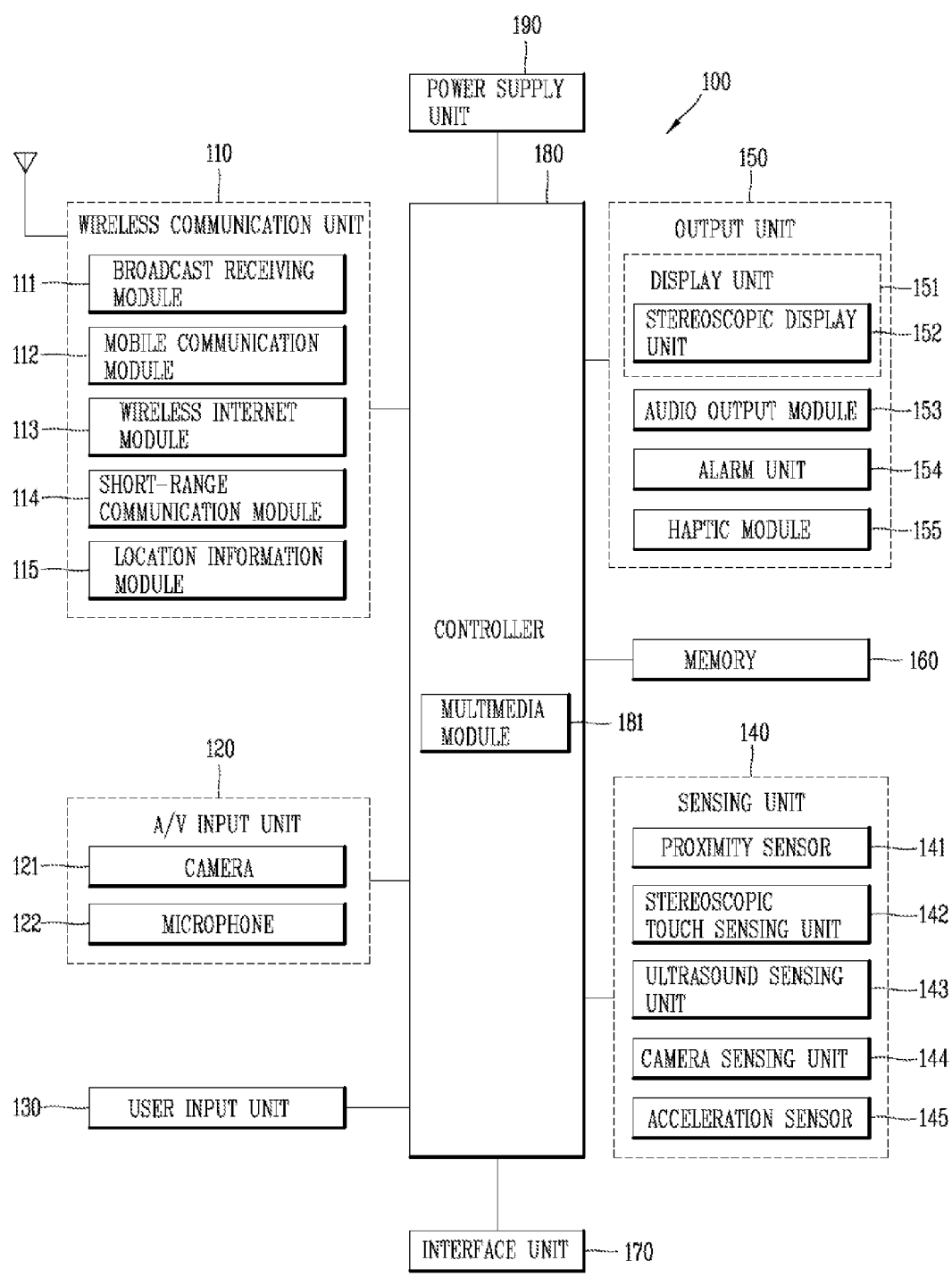
FIG. 1 is a block diagram showing a mobile terminal according to an embodiment of the present invention.

FIG. 1 is a block diagram of a mobile terminal 100 according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (NAB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a UPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 for the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output unit 153, an alarm unit 154, a haptic module 155, and the like.

The display unit 151 may display information processed in the mobile terminal 100. For example, when the mobile terminal 100 is in a phone call mode, the display unit 151 may display a User Interface (UI) or a Graphic User interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOILED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The display unit 151 may also be implemented as a stereoscopic display unit 152 for displaying stereoscopic images. Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area of a touch object, but also a touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 can sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic, field. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the three of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor. For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In more detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

An acceleration sensor 145 may sense a motion of the terminal body. For instance, the accelerations sensor 145 may sense a spatial movement of the terminal body based on X, Y and Z axes. Further, the acceleration sensor 145 may sense not only a dynamic force of the terminal body such as an acceleration, a vibration and an impact, but also a moving speed, an angular speed, etc.

The audio output module 153 converts and outputs as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact: of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random. Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively.

Also, the controller 180 can execute a lock state to restrict a user from inputting control commands for applications when a state of the mobile terminal meets a preset condition. Also, the controller 180 can control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software Codes can be implemented by a software application written in any suitable programming language. The software codes may be stored in the memory 160 and executed by the controller 180.

Hereinafter, a communication system which is operable with the mobile terminal 100 according to the present invention will be described.

Figure 2A:
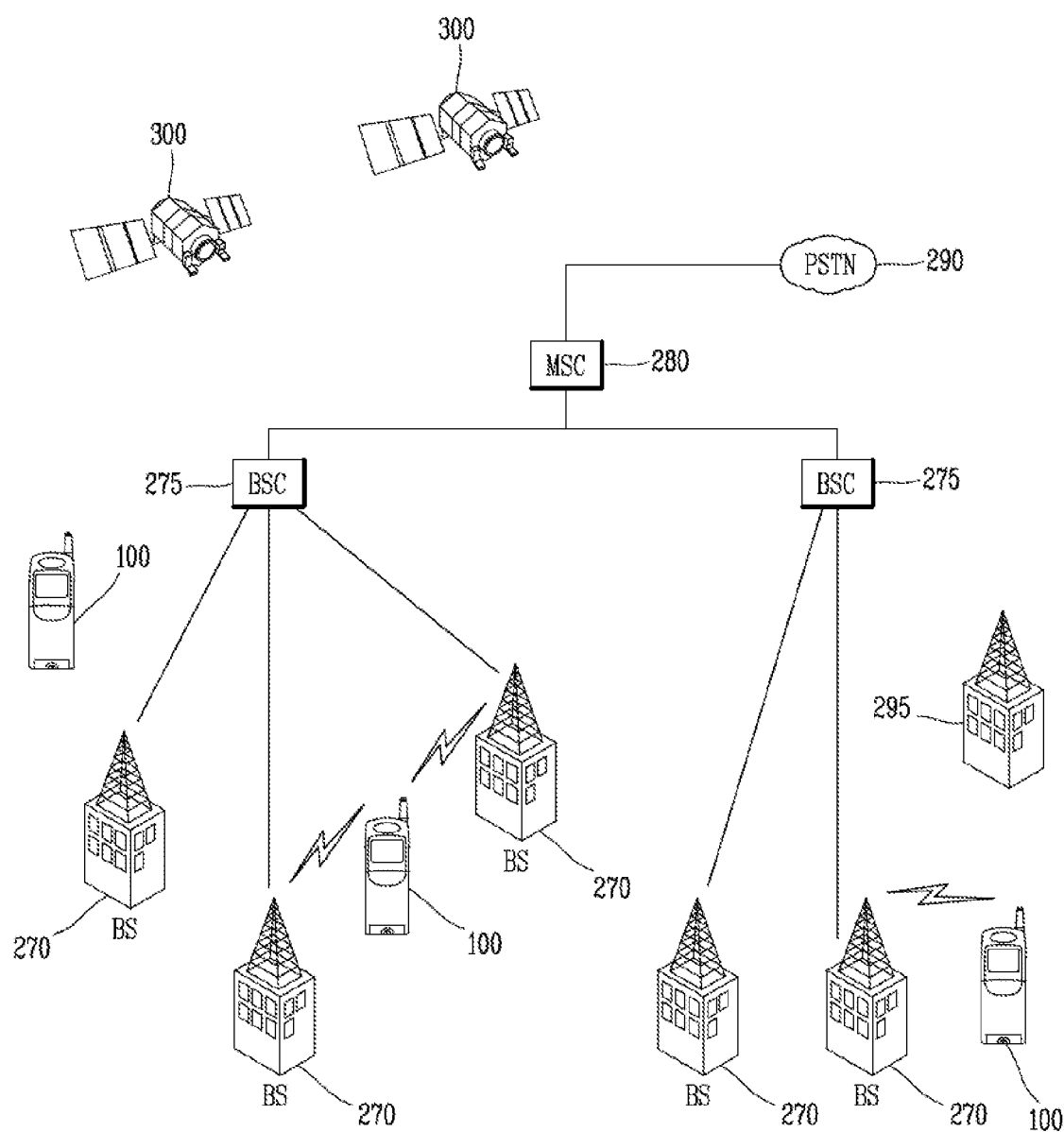
FIGS. 2A and 2B are conceptual diagrams of a communication system where a mobile terminal according to the present invention is operable.
Figure 2B:
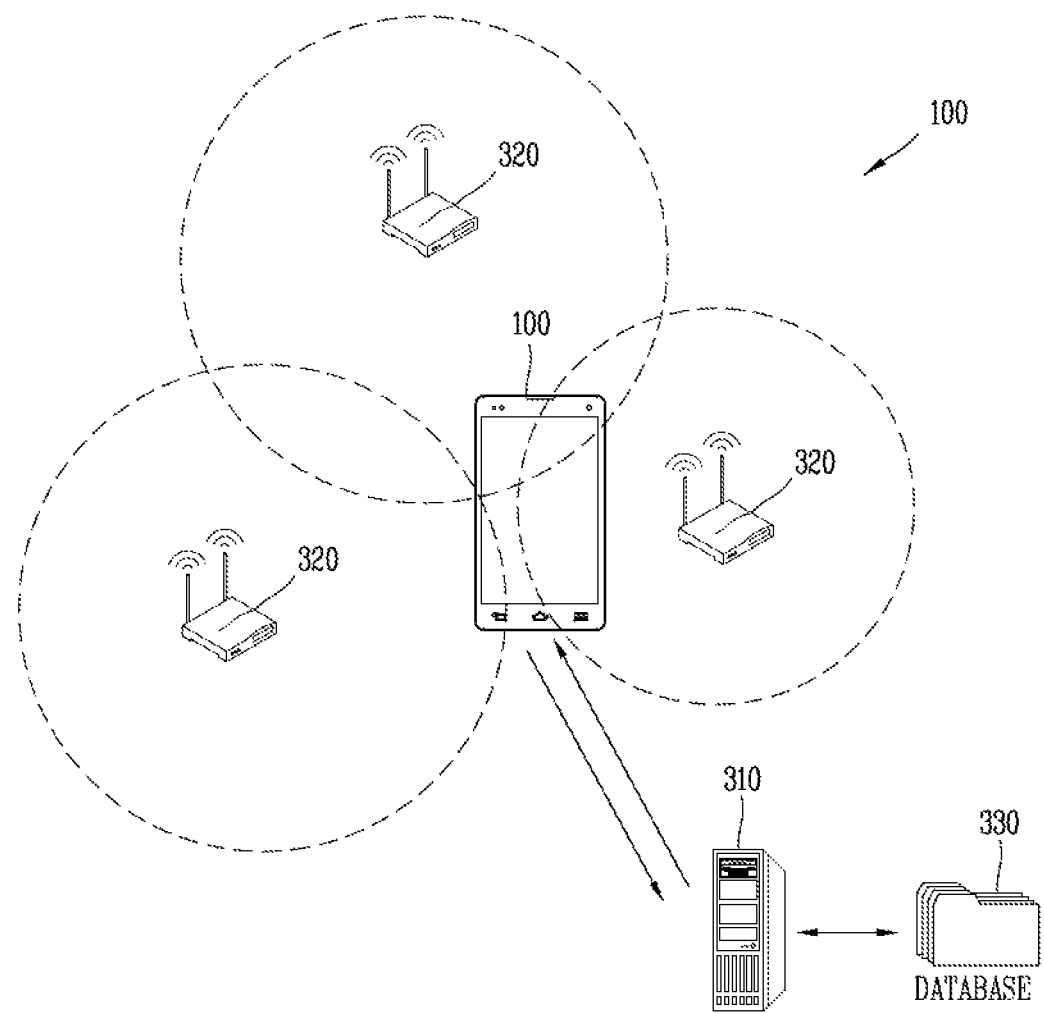

FIGS. 2A and 2B are conceptual views of a communication system operable with a mobile terminal 100 in accordance with the present invention. First, referring to FIG. 2A, such communication systems utilize different air interfaces and/or physical layers. Examples of such air interfaces utilized by the communication systems include Frequency Division Multiple Access (FDMA). Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (Wi-Fi) positioning system (WPS), with reference to FIG. 2B.

The Wi-Fi positioning system (WPS) 300 refers to a location determination technology based on a wireless local area network (WLAN) using Wi-Fi as a technology for tracking the location of the mobile terminal 100 using a Wi-Fi module provided in the mobile terminal 100 and a wireless access point 320 for transmitting and receiving to and from the Wi-Fi module.

The Wi-Fi positioning system 300 may include a Wi-Fi location determination server 310, a mobile terminal 100, a wireless access point (AP) 320 connected to the mobile terminal 100, and a database 330 stored with any wireless AP information.

The Wi-Fi location determination server 310 extracts the information of the wireless AP 320 connected to the mobile terminal 100 based on a location information request message (or signal) of the mobile terminal 100. The information of the wireless AP 320 may be transmitted to the Wi-Fi location determination server 310 through the mobile terminal 100 or transmitted to the Wi-Fi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The Wi-Fi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the Wi-Fi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID. RSSI, channel information, privacy, network type, latitude and longitude coordinate, building at which the wireless AP is located, floor number, detailed indoor location information (UPS coordinate available), AP owner's address, phone number, and the like.

In this manner, any wireless AP information and location information corresponding to the any wireless AP are stored together in the database 330, and thus the Wi-Pi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
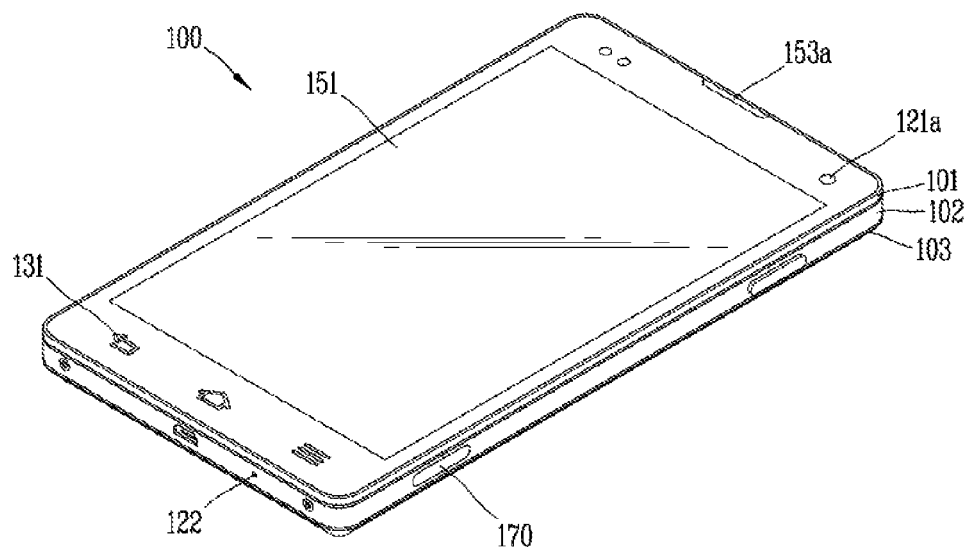
FIG. 3A is a front perspective view of an example of a mobile terminal related to the present invention.

Hereinafter, a structure of the mobile terminal shown in FIG. 1 according to an embodiment of the present invention will be explained in more detail. In particular, FIG. 3A is a from perspective view of the mobile terminal 100 according to an embodiment of the present invention.

The mobile terminal 100 according to an embodiment of the present invention is a bar type mobile terminal. However, the present invention is not limited to this, but may be applied to a watch type, a clip type, a glasses type, a folder type in which two or more bodies are coupled to each other so as to perform a relative motion, a swing type, a swivel type, etc.

A case (casing, housing, cover, etc.) forming an appearance of a terminal body may include a front case 101 and a rear case 102. Various components may be accommodated in a space formed by the front case 101 and the rear case 102. At least one intermediate case may be disposed between the front case 101 and the rear case 102, A battery cover 103 for covering a battery 191 may be detachably coupled to the rear case 102.

Such cases may be formed by injection-molded synthetic resin, or may be formed using a metallic material such as stainless steel (STS), titanium (Ti) and aluminum (Al).

A display unit 151, a first audio output unit 153a, a first camera 121a, a first user input unit 131, etc. may be formed on the front surface of the terminal body. A microphone 122, an interface unit 170, a second user input unit 132, etc. may be formed on the side surface of the terminal body.

The display unit 151 is configured to display (output) information processed by the mobile terminal 100. The display unit 151 may include a liquid crystal display (LCD) module, a thin film transistor-liquid crystal display (TFT LCD), an organic light-emitting diode (OLED), a flexible display, a three-dimensional (3D) display and an e-ink display.

The display unit 151 may include a touch sensing mechanism for sensing content input in a touch manner. Once a region on the display unit 151 is touched, content corresponding to the touched region is input. Content input in a touch manner may be texts, or numbers, or menu items which can be instructed or set in each mode.

The touch sensing mechanism may be formed to be transmissive so that the display unit 151 can be viewed, and may include a structure for enhancing visibility of the display unit 151 at a bright place. Referring to FIG. 3A, the display unit 151 occupies most parts of the front surface of the front case 101.

The first audio output unit 153a and the first camera 121a are disposed at a region close to one end of the display unit 151, and the first user input unit 131 and the microphone 122 are disposed at a region close to another end of the display unit 151. The second user input unit 132 (refer to FIG. 3B), an interface unit 170, etc. may be disposed on the side surface of the terminal body.

The first audio output unit 153a may be implemented as a receiver for transmitting a call sound to a user's ears, or a loud speaker for outputting each type of alarm sounds or a play sound of multimedia.

A sound generated from the first audio output unit 153a may be emitted along an assembly gap between structures. In this instance, a hole for output of a sound may not be exposed to outside, and thus the appearance of the mobile terminal 100 may be simplified.

The first camera 121a processes image data of still pictures or video acquired by an image capture device in a video capturing mode or an image capturing mode. The processed image frames may be displayed on the display unit 151.

The user input unit 130 is manipulated to input a command for controlling the operation of the mobile terminal 100, and may include a first manipulation unit 131 and a second manipulation unit 132. The first manipulation unit 131 and the second manipulation unit 132 may be referred to as manipulating portions, and may include any type of ones that can be manipulated in a user's tactile manner such as touch, push and scroll.

In the drawings, the first manipulation unit 131 is implemented as a touch key. However, the present invention is not limited to this. For instance, the first manipulation unit 131 may be implemented as a mechanical key, or combination of a touch key and a push key.

Content input by the first manipulation unit 131 and/or the second manipulation unit 132 may be set in various manners. For instance, the first manipulation unit 131 may be used to input commands such as menu, home, cancellation and search. In addition, the second manipulation unit 132 may be used to input a command such as controlling a size of a sound output from the first audio output module 153a, or a command such as converting the current mode of the display unit 151 into a touch recognition mode.

The microphone 122 is configured to receive a user's voice, other sound, etc. The microphone 122 may be provided at a plurality of positions, and may be configured to receive a stereo sound.

The interface unit 170 may be generally implemented to interface the mobile terminal 100 with external devices. For example, the interface unit 170 may include at least one of a connection terminal for wired or wireless connection with an earphone, a port for short-range communication (e.g., Infrared ray port (IrDA Port), Bluetooth port, wireless LAN port, etc.), and a power supply terminal for supplying power to the mobile terminal 100. Such interface unit 170 may be implemented as a socket for accommodating therein an external card such as a Subscriber identity Module (SIM), a User Identity Module (UIM), and a memory card for information storage.

Figure 3B:
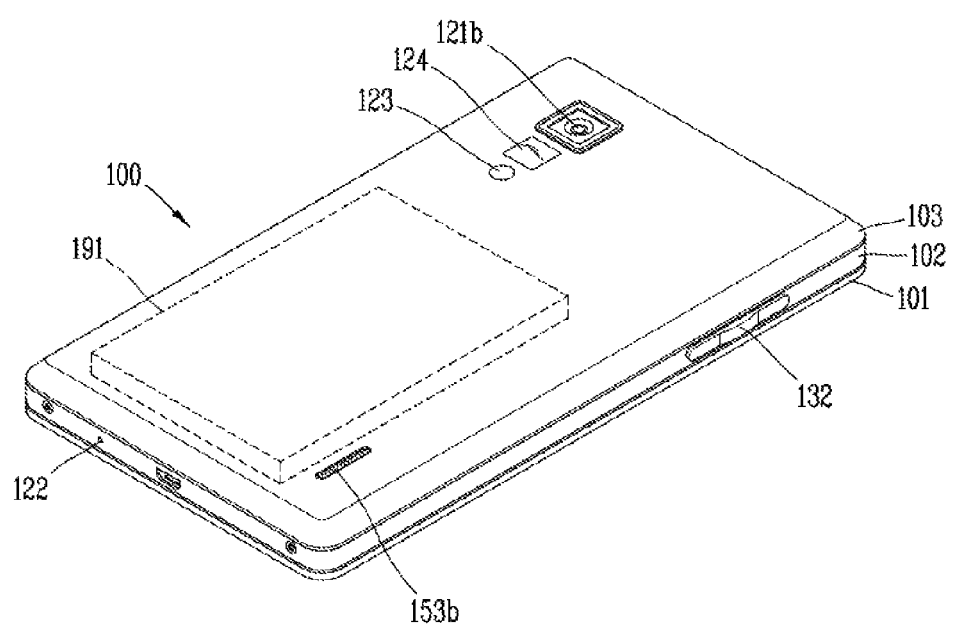
FIG. 3B is a rear perspective view of the mobile terminal of FIG. 3A.

FIG. 3B is a rear perspective view of the mobile terminal 100 of FIG. 3A. Referring to FIG. 3B, a second camera 121b may be additionally mounted to the rear surface of the terminal body, i.e., the rear case 102. The second camera 121b faces a direction which is opposite to a direction faced by the first camera 121a (refer to FIG. 1), and may have pixels different from those of the first camera 121a.

For example, the first camera 121a may operate with relatively lower pixels (lower resolution). Thus, the first camera 121a may be useful when a user can capture his or her face and send it to a calling party in a video call mode or the like. On the other hand, the second camera 121b may operate with a relatively higher pixels (higher resolution) such that it can be useful for a user to obtain higher quality pictures for later use. The first camera 121a and the second camera 121b may be installed at the terminal body so as to rotate or pop-up.

A flash 123 and a mirror 124 may be additionally disposed close to the second camera 121b. When capturing an object by using the second camera 121b, the flash 123 provides light to the object. The mirror 124 can cooperate with the second camera 121.b to allow a user to photograph himself or herself in a self-portrait mode.

A second audio output unit 153b may be additionally disposed on the rear surface of the terminal body. The second audio output module 153b may implement a stereo function together with the first audio output module 153a (refer to FIG. 3A), and may be used for calling in a speaker phone mode.

A broadcast signal receiving antenna as well as an antenna for calling may be additionally disposed on the side surface of the terminal body. An antenna, part of the broadcast receiving module 111 may be installed to be retractable into the terminal body.

The power supply unit 190 for supplying power to the mobile terminal 100 is mounted to the terminal body. The power supply unit 190 may include a battery 191 mounted in the terminal body or detachably mounted to the terminal body. In the drawings, the battery cover 103 is coupled to the rear case 102 so as to cover the battery 191, thereby preventing separation of the battery 191 and protecting the battery 191 from external impacts or foreign materials.

A mobile terminal according to an embodiment of the present invention which can include at least one of the above-described elements includes first and second cameras, and when the compensation mode for images captured by the first camera, activates the second camera and compensates the images captured by the first camera by using the activated second camera.

That is, the mobile terminal according to the embodiment of the present invention can compensate images captured by the first camera by using images captured by the second camera. For example, the first and second cameras can accurately identify the characteristics of a light source positioned near the terminal. Accordingly, it is possible to provide images that are properly compensated according to the characteristics of the light source.

Hereinafter, a mobile terminal which identifies the characteristics of a light source by using a plurality of cameras and compensates images captured by the cameras according to the characteristics of the light source, and a control method thereof will be described in detail with reference to the attached drawings.

Figure 4:
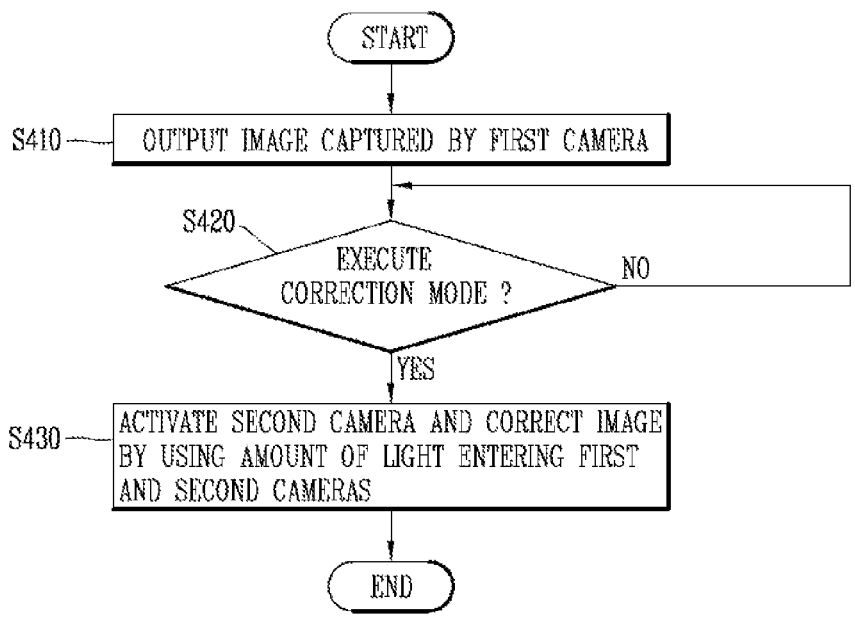
FIG. 4 is a flowchart illustrating a control method of a mobile terminal according to an embodiment of the present invention.
Figure 5:
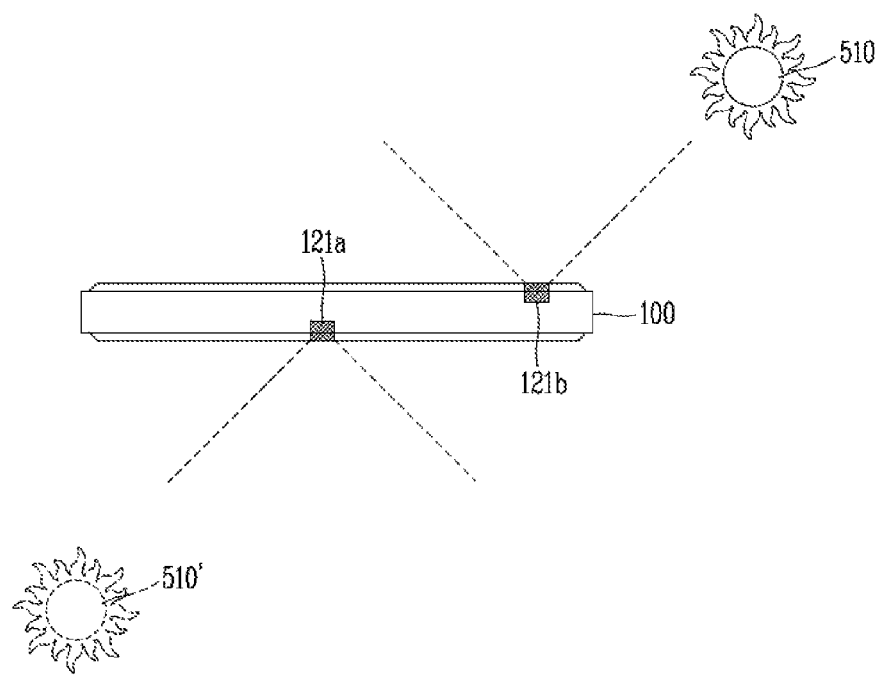
FIG. 5 is a conceptual diagram illustrating the control method of FIG. 4.

FIG. 4 is a flowchart illustrating a control method of a mobile terminal according to an embodiment of the present invention, and FIG. 5 is a conceptual diagram illustrating the control method of FIG. 4.

Referring to FIG. 4, the mobile terminal according to an embodiment of the present invention includes first and second cameras, and the method includes outputting an image captured by the first camera (S410). In the present invention, the ordinal numbers such as "first" and "second" are used to distinguish cameras and are not used to denote a particular camera.

Even when the first camera captures the same subject, with the mobile terminal fixed in place, different images may be captured depending on the characteristics of a light source. For example, if the light source is positioned to backlight the first camera, the subject may look dark, or if the light source is positioned to front-light the first camera, the subject may look too bright making it difficult to see the outline of the subject. That is, different images may be captured depending on the characteristics of the light source.

Herein, the characteristics of the light source are associated with at least one of the following: location, type, brightness, color temperature, and number of light sources, and may vary depending on shooting location and shooting time. Also, images captured by the first camera may come out differently depending on the characteristics of the light source.

Next, the method includes determining whether or not the compensation mode is executed (S420). The compensation mode refers to a mode for compensating an image captured by the first camera according to the characteristics of the light source. If a predetermined condition is satisfied, the compensation mode may be executed by a controller 180.

For example, the compensation mode may be executed by user input. The mobile terminal may include a key for executing the compensation mode, or output an icon that is formed on a display unit 151 to execute the compensation mode. Upon detecting user input on the key or the icon, the controller 180 can execute the compensation mode.

The compensation mode may also be executed if the state of the mobile terminal satisfies a predetermined condition. For example, assuming that the surface of the mobile terminal where the display unit 151 is arranged is the front surface, if an image captured by the camera arranged on the front surface is output to the display unit 151, the controller 180 can automatically execute the compensation mode. This is because, if someone is shooting images with the front camera, rather than the rear camera, it means that they are shooting themselves, and self-shooting is greatly affected by light.

Besides, the controller 180 also can automatically execute the compensation mode if both the first and second cameras are activated and first and second images captured by the first and second cameras are output to the display unit 151. This is because the brightness of the first and second images may differ according to the location of the light source.

Next, the method includes activating the second camera as the compensation mode is executed and compensating an image captured by the first camera by using the amount of light entering the first and second cameras (Yes in S420 and S430). However, the present invention is not limited thereto, and the second camera may be activated before executing the compensating mode.

The first and second cameras may be arranged on the main body to face in different directions. For example, referring to FIG. 5, the first camera 121*a* and the second camera 121*b* may be formed to face in opposite directions. If at least three or more cameras are arranged on the main body, at least one of the remaining cameras which are inactive may be activated as the compensation mode is executed. The greater the number of activated cameras, the more accurate the analysis of the characteristics of the light source. For convenience of description, the mobile terminal according to the embodiment of the present invention will be described by taking an example where the first and second cameras are used.

The controller 180 can identify the characteristics of the light source by using the amount of light entering the first and second cameras arranged to face in different directions. For example, the first and second cameras may be used to shoot first and second images, and the first and second images may be used to calculate the amount of light entering the first and second cameras.

By comparing the calculated amount of light entering the first camera with that entering the second camera, the characteristics of the light source can be identified. For example, referring to FIG. 5, the controller 180 can identify the location 510 and 510' of the light source, which is one of the characteristics of the light source, by using the first and second cameras.

Next, the characteristics of the light source will be discussed. The characteristics of the light source may be associated with at least one of the following: the location of the light source that corresponds to the front, rear, or lateral direction of the main body, the color temperature of the light source, the type of light source based on the color temperature, the brightness of the light source, and the number of light sources.

Furthermore, the controller 180 can compensate an image captured by the first camera according to the characteristics of the light source. For example, if the light source is positioned to backlight the first camera, the controller 180 can compensate the image so that the subject has a given or higher level of brightness, and if the light source is positioned to front light the first camera, the controller 180 can compensate the image so that a shadow cast near the subject is eliminated.

The controller 180 can compensate the image by using either a hardware method or a software method, based on the characteristics of the light source. In more detail, the hardware method may be changing settings for shooting in the first camera. For example, an image captured by the first camera can be compensated by changing the settings associated with the shutter speed, aperture, ISO sensitivity, white balance, etc. or the settings associated with a flash used for shooting.

The software method may be compensating at least some part of an image captured by the first camera by using an algorithm. For example, the controller 180 can compensate the at least some part by using an algorithm Which is configured to detect a part seen as moiré and eliminate the moiré according to the characteristics of the light source. In another example, the controller 180 can detect a part corresponding to a target subject in the image and compensate the detected part so that it has a predetermined brightness.

In this way, the controller 180 according to an embodiment of the present invention can identify the characteristics of the light source by using the amount of light entering the first and second cameras, and compensate an image captured by the first camera according to the characteristics of the light source.

Also, the controller 180 can output at least either a before-compensation image or an after-compensation image to the display unit 151. Besides, if the settings associated with the first camera are changed according to the characteristics of the light source, information regarding the changed settings can be output on the display unit 151.

As described above, according to the mobile terminal according to the embodiment of the present invention, the characteristics of the light source can be identified based on the amount of light entering the first and second cameras, and an image captured by the first camera can be compensated according to the characteristics of the light source. Because the first and second cameras formed to face in different directions are used, the characteristics of the light source can be accurately identified, and steady results of image shooting can be achieved, even with changes in light source.

Hereinafter, a method of executing the compensation mode and compensating an image will be described in detail, and a method of controlling the mobile terminal according to the control method of FIG. 4 will be described as well with reference to the attached drawings.

Figure 6:
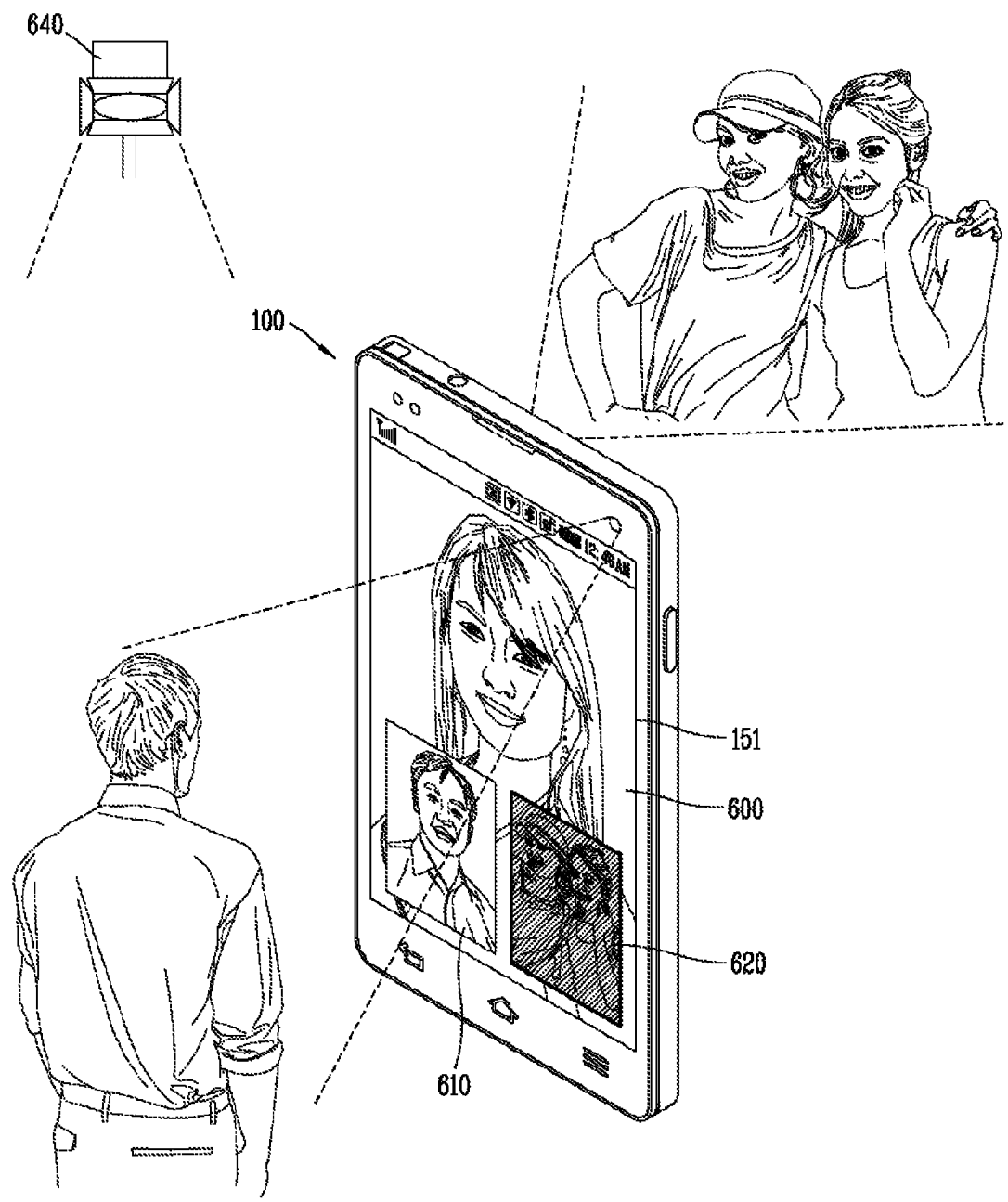
FIG. 6 is an illustration explaining the control method of FIG. 4 in further detail.

FIG. 6 is an overview illustrating the control method of FIG. 4 in further detail. For example, referring to FIG. 6, a video call function can be executed in the mobile terminal according to the embodiment of the present invention. The mobile terminal 100 can include a first camera 121*a*, a second camera (not shown), and a display unit 151.

When the video call function is executed, at least either a received image 600 received from the other party's terminal, or a front image 610 captured by the first camera 121*a*, or a rear image 620 captured by the second camera may be output on the display unit 151.

In this instance, there may be a difference in brightness between the front image 610 and the rear image 620 depending on the characteristics of the light source. For example, if the light source 640 is positioned in front of the main body, the brightness of the front image 610 may be greater than the brightness of the rear image 620.

Hereupon, the compensation mode can be implemented. The compensation mode may be executed by user input, or automatically executed if a predetermined condition is satisfied. For example, the compensation mode may be automatically executed when the video call function is executed.

When the compensation mode is executed, the controller 180 can compensate an image being output on the display unit 151 by using the amount of light entering the first and second cameras. The controller 180 can calculate the average luminance values of at least some part of each of the first and second images captured by the first and second cameras, and compensate at least one of the first and second images so that the difference between the average luminance values satisfy limiting criteria. In this instance, the some part may be a region of an image including a human face, or a particular region for which the average luminance value is calculated.

For example, referring to FIG. 6, the controller 180 can compensate the rear image 620, which looks darker than front image 610 due to the location of the light source, so that it looks brighter. For this compensation, the controller 180 can use at least either one of the above-mentioned hardware and software methods with reference to FIG. 4.

In addition, an after-compensation image, instead of a before-compensation image, of the rear image may be output, or the after-compensation image and the before-compensation image may be output simultaneously. If the after-compensation image and the before-compensation image are output simultaneously, the controller 180 can choose one of the two images based on user input.

When the video call function is executed, the controller 180 can transmit at least one of the front and rear images to the other party's terminal according to the user's selection. In this instance, the controller 180 can transmit a compensated image to the other party's terminal, based on the amount of light entering the first and second cameras.

Furthermore, if the compensated image is too bright or too dark to identify someone from others, the controller 180 can transmit an alternative screen to the other party's terminal. For example, if the brightness of the first image captured by the first camera is above a reference brightness level, a predetermined alternative screen, instead of the first image, may be transmitted to the other party's terminal. The predetermined alternative screen may be the second image captured by the second camera or an image stored in the memory 160.

As discussed above, the user of the mobile terminal according to an embodiment of the present invention can get compensated images based on the amount of light entering the first and second cameras. Besides, the mobile terminal according to an embodiment of the present invention can compensate moiré in an image which appears in different forms depending on the location of the light source. For example, image noise generated in images can be eliminated according to a backlighting or front-lighting situation.

Hereinafter, a method of compensating an image according to the location of the light source in the mobile terminal according to the embodiment of the present invention will be described in more detail.

Figure 7:
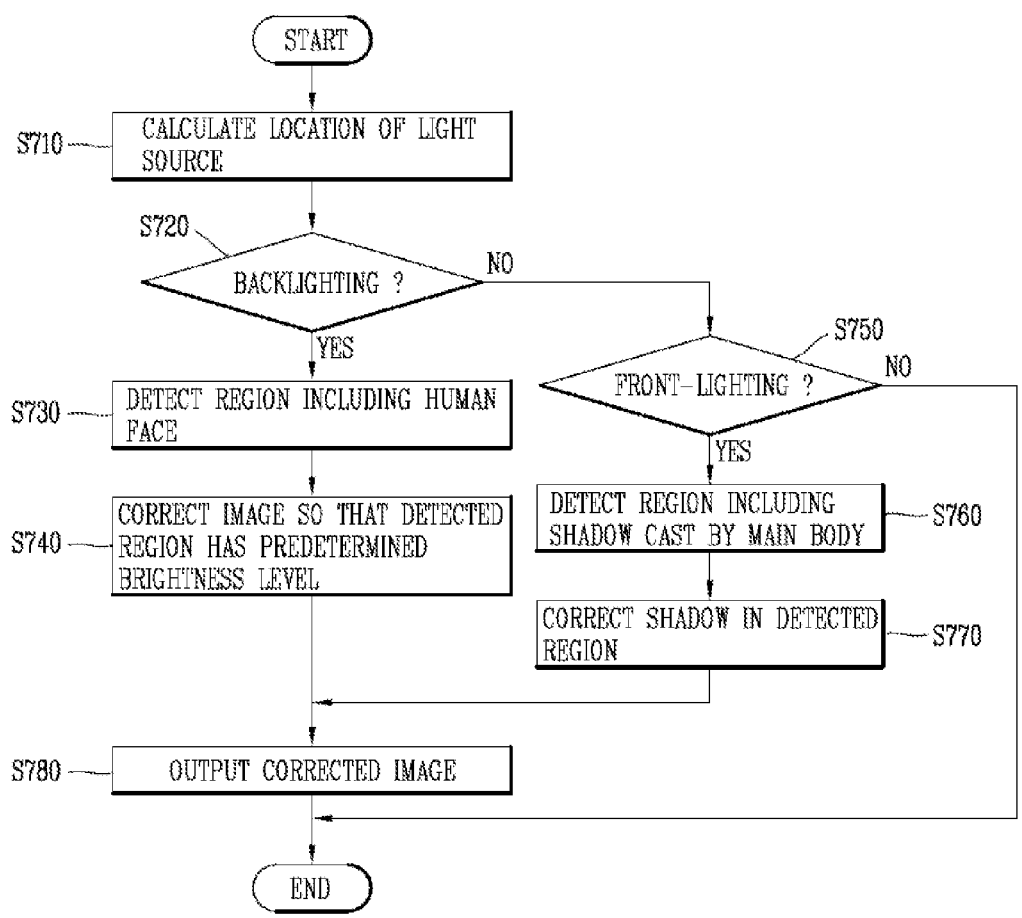
FIG. 7 is a flowchart illustrating in further detail a method of compensating an image according to the location of the light source in the control method of FIG. 4.
Figure 8A:
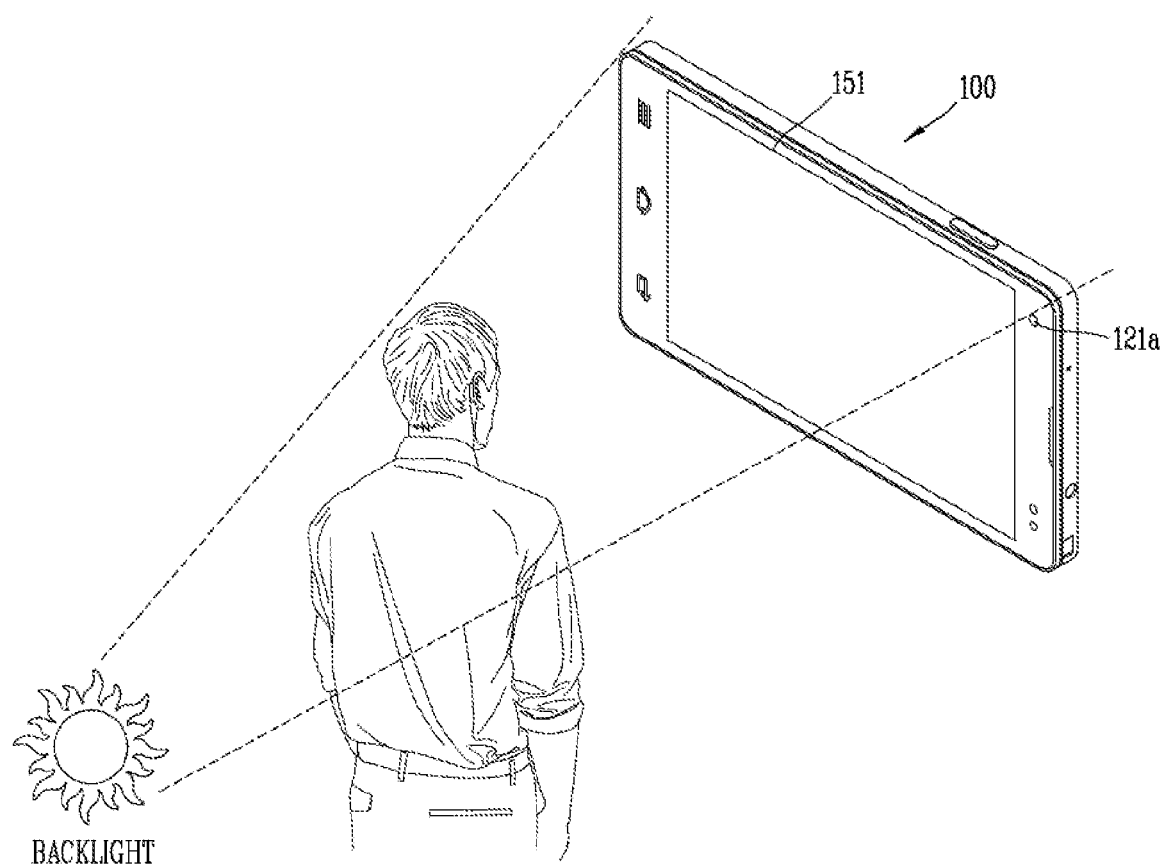
FIGS. 8A and 8B and FIGS. 9A and 9B are conceptual diagrams illustrating the control method illustrated in FIG. 7.

In particular, FIG. 7 is a flowchart illustrating in further detail a method of compensating an image according to the location of the light source in the control method of FIG. 4, and FIGS. 8 and 9 are conceptual diagrams illustrating the control method illustrated in FIG. 7.

Referring to FIG. 7, FIGS. 8A and 8B, and FIGS. 9A and 9B, the mobile terminal 100 may include a display unit 151, a second camera 121*a*, and a second camera (not shown). Referring to FIG. 7, the method includes calculating the location of the light source by using the amount of light entering the first and second cameras (S710). For example, the location of the light source may correspond to the front direction, rear direction, or lateral direction of the main body with respect to the first camera.

An image captured by the first camera includes image noise which differs depending on the location of the light source, and the controller 180 can calculate the location of the light source by using the image captured by the first camera and detect image noise associated with the calculated location of the light source.

That is, different steps may be performed depending on whether the light source is backlighting the first camera (S720) or front-lighting the first camera (S750). In this embodiment, referring to FIG. 8A, the light source positioned in the front direction of the first camera means that the light source will backlight the first camera. In addition, if the light source backlights the first camera, noise may be generated in the human face included in the image due to the brightness of the light source, as shown in (a) of FIG. 8B.

To eliminate such image noise, the controller 180 detects a region including the human face from the image (S5730). In this instance, the controller 180 can measure the brightness of the detected region and compare the measured brightness with a brightness criterion.

Next, the image is compensated so that the detected region has a predetermined brightness level (S740). In this instance, the controller 180 can compensate only the detected region or the entire image including the detected region.

For example, the controller 180 can change the settings associated with the aperture to focus the camera on the detected region, or change the settings associated with the shutter speed to give a predetermined level of brightness to the detected region, change the settings for activating the flash, or change the scene mode of the camera to a mode (e.g., high dynamic range mode; referred hereinafter to as "HDR mode") optimized for backlighting.

Alternatively, the controller may compensate the luminance of a detected region based on preset compensation factors, or compensate for errors in noise-containing pixels in the image, or perform gamma compensation on some regions.

If any region including the face is not detected, the settings associated with the camera may be changed to increase the brightness of the image, or the image may be compensated by using an algorithm. Then, the above-described procedure can be repeated a reference number of times until the face is detected. If the face is not detected while repeating the above-described procedure the reference number of times, it is deemed that shooting cannot be done due to backlighting, and the controller 180 can output guidance information to the display unit 151 to help change the direction where the camera faces.

Figure 9A:
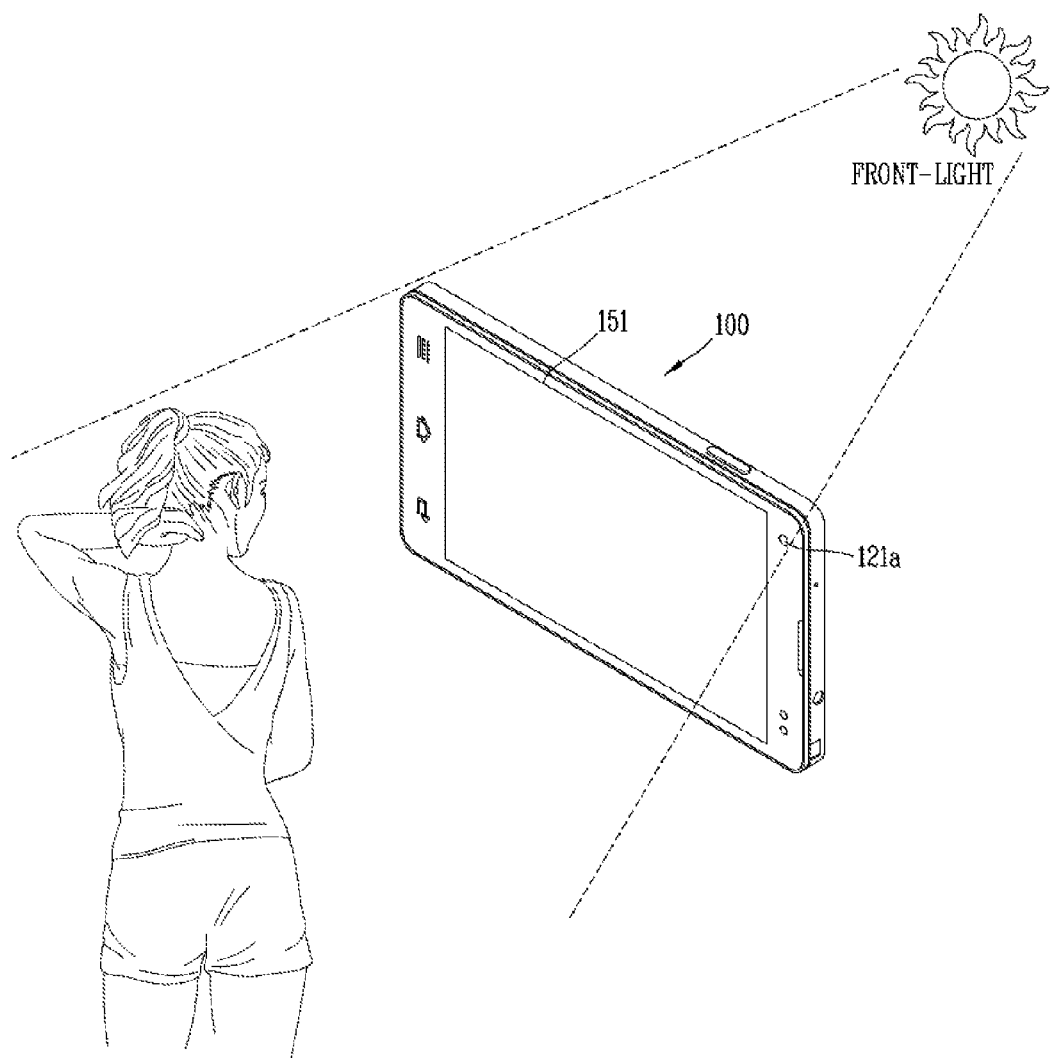

In another embodiment, referring to FIG. 9A, the light source may be positioned in the rear direction of the first camera 121a. That is, the light source will backlight the first camera 121a. If the light source front-lights the first camera, a shadow 910 cast by the terminal body may be included as image noise in the image, as shown in (a) of FIG. 9B.

To eliminate such image noise, the controller 180 detects the shadow cast by the main body from the image. In this instance, the controller 180 can calculate the direction and length of the shadow cast by the main body according to the characteristics of the light source, and eliminate the shadow from the image by using the calculated information, an image filter, etc. (S770).

Even when the light source is front-lighting, the shadow cast by the main body may not be seen according to the location of the light source. In this instance, the controller 180 can adjust the ISO sensitivity of the first camera, based on the amount of light entering the second camera, in order to shoot optimal images in the front-lighting situation.

Figure 8B:
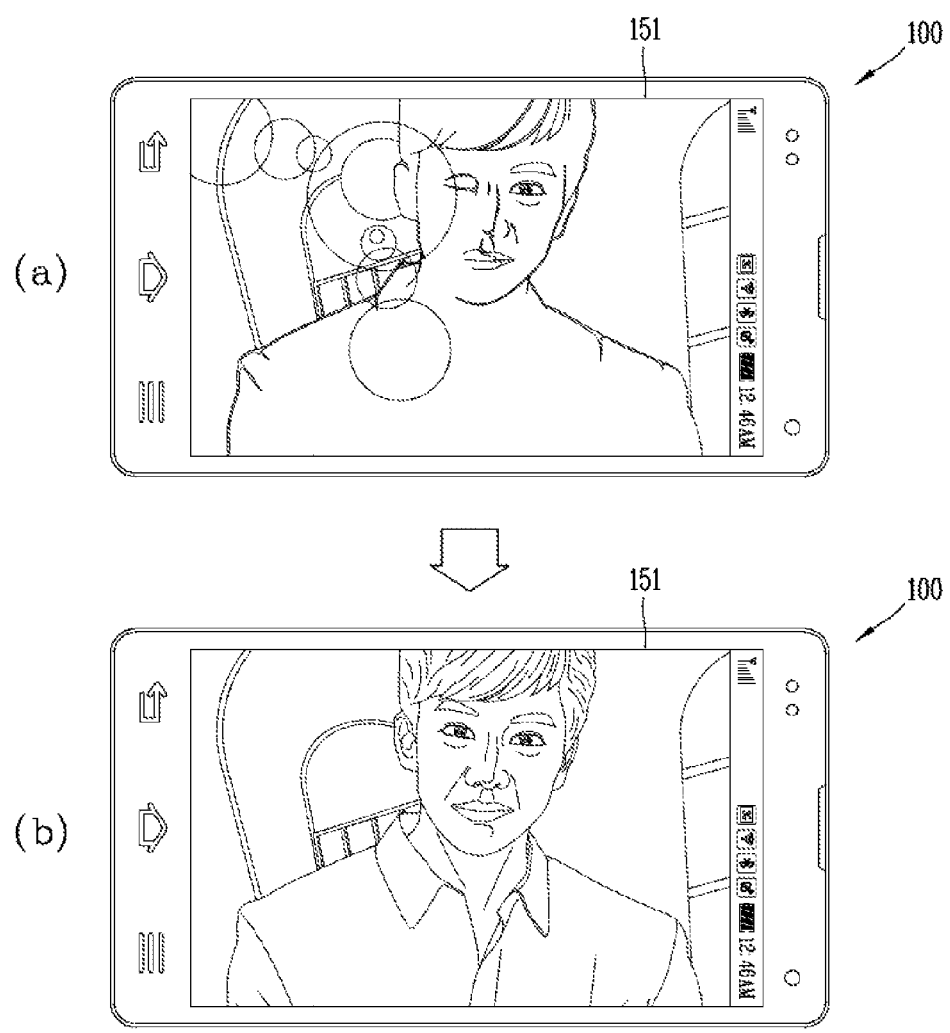
Figure 9B:
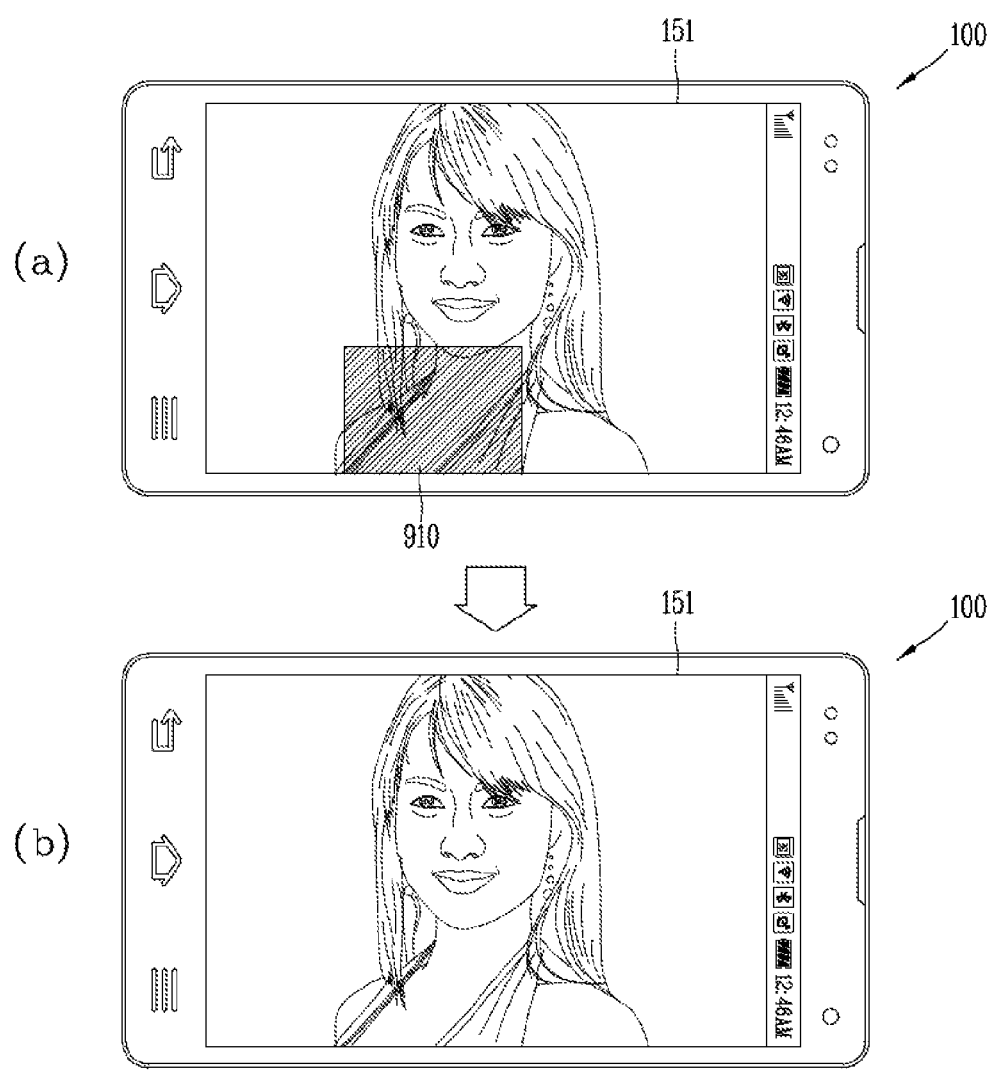

Once an image is compensated, the controller 180 can output the compensated image on the display unit 151, as shown in FIG. 8B(b) and FIG. 9B(b) (S780).

In this way, the mobile terminal according to an embodiment of the present invention can compensate image noise which appears in different forms depending on the location of the light source. The light source may be positioned to do backlighting or front-lighting. Even if the user does not find image noise, the controller 180 can automatically compensate the image noise.

Figure 10:
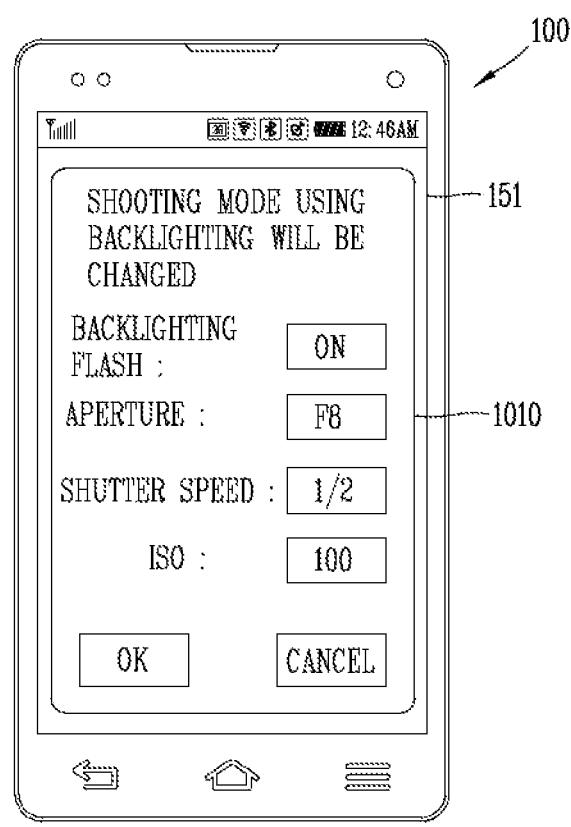
FIG. 10 is a conceptual diagram illustrating a method of outputting information regarding the compensation of images in the mobile terminal according to the embodiment of the present invention.

Moreover, as shown in FIG. 10, the controller 180 can output information 1010 regarding compensation to the display unit 151 before compensating an image. For example, when the compensation mode is executed while an image captured by the first camera is being output, the controller 180 can detect the location of the light source and change the settings of the first camera based on the location of the light source. Before changing the settings for the first camera, the controller 180 can output information regarding the settings to be changed as the information regarding compensation. The information regarding compensation may be output at least either visually, or audibly, or tactually.

The user can choose whether to use a before-compensation image or an after-compensation, image by using a graphics object such as "confirm" or "cancel". For example, if "confirm" is selected, the controller 180 can output the before-compensation image to the display unit 151, and if "cancel" is selected, may output the before-compensation image to the display unit 151.

Figure 11:
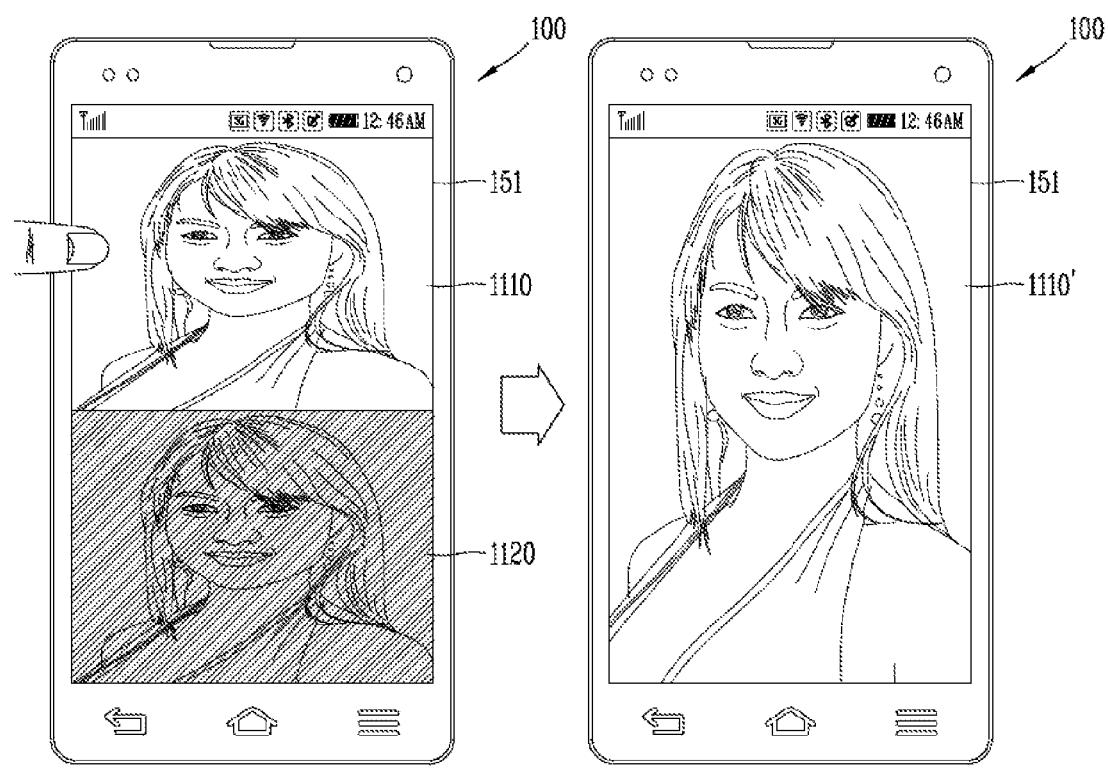
FIG. 11 is a conceptual diagram illustrating a method of selecting either a before-compensation image or an after-compensation image in the mobile terminal according to the embodiment of the present invention.

Besides, as shown in FIG. 11, the controller may output a before-compensation image 1120 and an after-compensation image 1110 on the display unit 151. Also, the user can check images output on the display unit 141, and choose whether to execute the compensation mode according to the characteristics of the current light source.

For example, when the after-compensation image 1110 is selected, the controller 180 can continuously execute the compensation mode, and output the compensated image 1110' to the display unit 151. In contrast, when the before-compensation image 1120 is selected, the controller 180 can stop the execution of the compensation mode. Accordingly, the user can do shooting in such a way as to compensate an image according to the characteristics of the light source or in a way the user wants.

The mobile terminal according to the embodiment of the present invention compensates an image according to the characteristics of the light source and outputs information regarding compensation, so that the user can see how the image is compensated as the compensation mode is executed, and choose whether to execute compensation or not. Therefore, the convenience of the user of the mobile terminal can be enhanced.

Besides, the controller 180 can compensate an image captured by the first camera in response to the execution of the compensation mode. In this instance, the controller 180 can output guidance information to the display unit 151 to help change the direction where the first camera faces depending the characteristics of the light source.

Figure 12A:
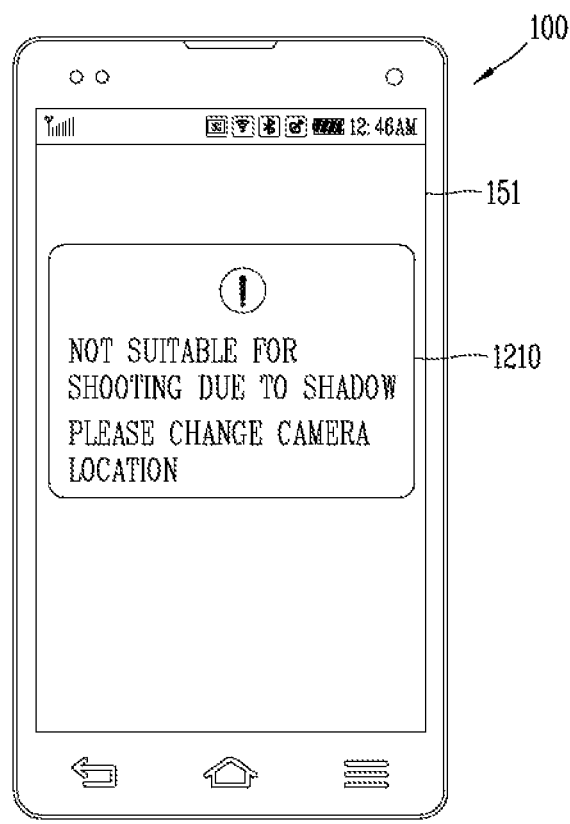
FIGS. 12A and 12B are conceptual diagrams illustrating a method of outputting guidance information to help change the direction where the first camera faces, in the mobile terminal according to the embodiment of the present invention.

For example, as shown in FIG. 12A, the controller 180 can output guidance information 1210 to the display unit 151 to help change the direction where the first camera. Such guidance information may include information regarding the characteristics (e.g., the location, type, etc.) of the light source and information about image noise caused by the characteristics of the light source. Also, such guidance information may be output at least either visually, or audibly, or tactually.

Further, the controller 180 can calculate the characteristics of the light source by using images captured by the first and second cameras, and determine whether it is appropriate to do shooting with the first camera or not, based on the calculated characteristics of the light source. For example, if images captured by the cameras are under a preset condition, including a particular region of the entire image looking brighter than a reference brightness level or the average luminance of the entire image being higher than the maximum luminance or lower than the minimum luminance, shooting with the first camera may be deemed inappropriate.

Figure 12B:
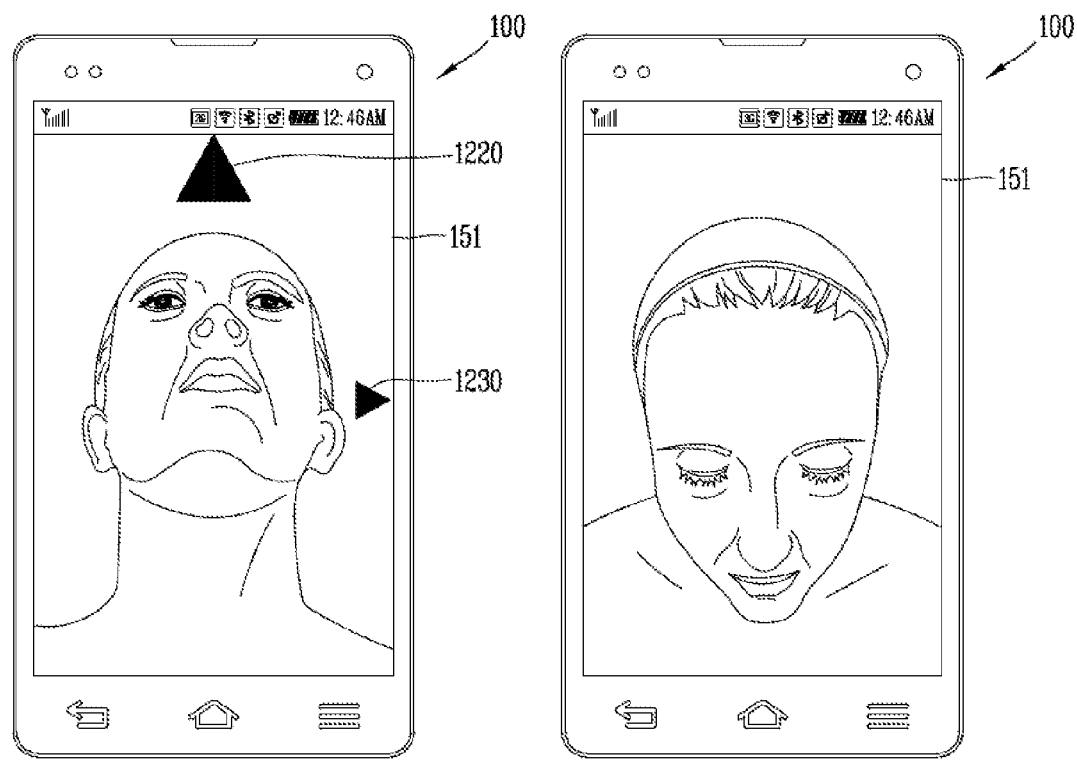

Moreover, as shown in FIG. 12B, the controller 180 can output on the display unit 151 at least one graphics object 1220 and 1230 which provides guidance to a position suitable for shooting images, based on the characteristic of the light source.

If it is inappropriate to shooting images with the first camera, the controller 180 can output a graphics object on the display unit 151 while simultaneously outputting an image captured by the first camera. More specifically, the controller 180 can calculate the direction suitable for shooting images, based on the characteristics of the light source, and create a graphics object which guides the first camera to face in the calculated direction. The graphics object may be a mark indicating the direction where the terminal body has to be moved. The controller 180 can intuitively inform the user of the direction where the terminal body has to be moved, by varying the output position and output size of the mark.

Referring to FIG. 12B, the user can move the terminal body in such a way as to change the direction of the first camera according to the first and second graphics objects 1220 and 1230 output on the display unit 151. In this instance, at least one of the output position and output size of the graphics objects may change with the movement of the main body. For example, as the user moves the mobile terminal up, the size of the first graphics object 1220 may gradually get smaller, and appear when it reaches a particular position. When all the graphics objects are gone, the user can shoot moving images or pictures and get the best results according to the characteristics of the light source.

Meanwhile, in the mobile terminal according to the embodiment of the present invention, the controller 180 can change the scene mode (or shooting mode) of the first camera, with the use of an image captured by the second camera, while outputting an image captured by the first camera. This will be described in detail below with reference to FIG. 13.

Figure 13:
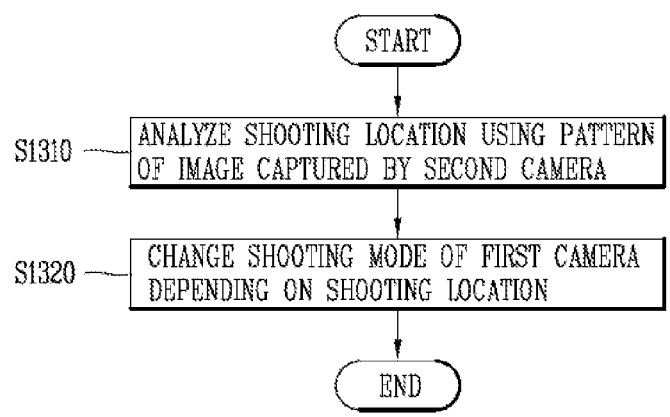
FIG. 13 is a flowchart illustrating the control method of FIG. 4 in further detail.

FIG. 13 is a flowchart illustrating the control method of FIG. 4 in further detail. A description of the steps S410 through S430 described with reference to FIG. 4 will be omitted.

If the first camera is a front camera on the front of the terminal body, the controller 180 can automatically execute the compensation mode when an image captured by the first camera is output to the display unit 151.

Next, referring to FIG. 12, the method includes analyzing the shooting location using the pattern of an image captured by the second camera in the mobile terminal according to the embodiment of the present invention (S1310).

The controller 180 can analyze the characteristics of the light source by using the image captured by the second camera. Further, the controller 180 can analyze the shooting location using the pattern in the image. For example, the controller 180 can tell whether the image shooting location is indoors or outdoors by using an image pattern recognition and extraction technique.

If the first camera is a front camera, the second camera may be a rear camera. Because the front camera is usually used for self-shooting, an image captured by the first camera may include a human face. Unlike the first camera, the second camera can capture the scene of the location where the camera is stationed. Accordingly, when the front camera is activated, the controller 180 can activate the rear camera and analyze the shooting location using the pattern of an image captured by the rear camera.

For more accurate analysis, the controller 180 can use a wireless communication unit 110. For example, when the compensation mode is executed, the controller 180 can tell whether the shooting location is indoors or outdoors, based on whether GPS (global positioning information) is received from a satellite or not. If GPS information is received, the shooting location is considered indoors. If not, it is considered outdoors.

In the analysis of the shooting location, the method includes changing the shooting mode of the first camera depending on the analyzed shooting location (S1320). For example, the analyzed shooting location may be indoors or outdoors.

If the shooting location is analyzed as indoors, the controller 180 can change the scene mode of the first camera to indoors. Also, the settings associated with the first camera can be changed by analyzing the characteristics of the light source entering the second camera. For example, the controller 180 can analyze the type of the light source using the color temperature, and adjust the white balance of the first camera.

If the shooting location is analyzed as outdoors, the controller 180 can change the scene mode of the first camera to outdoors. By using the pattern of an image captured by the second camera, it is possible to tell if it is sunny or cloudy and adjust the ISO sensitivity according to the weather and the intensity of light entering the second camera.

Besides, if the shooting location is analyzed as indoors, the controller 180 can receive weather information by using the wireless communication unit, and analyze the pattern of the image captured by the second camera, based on the received weather information. As such, the controller 180 can analyze the pattern of the image more accurately, and compensate the image captured by the first camera by using the analyzed information.

Figure 14:
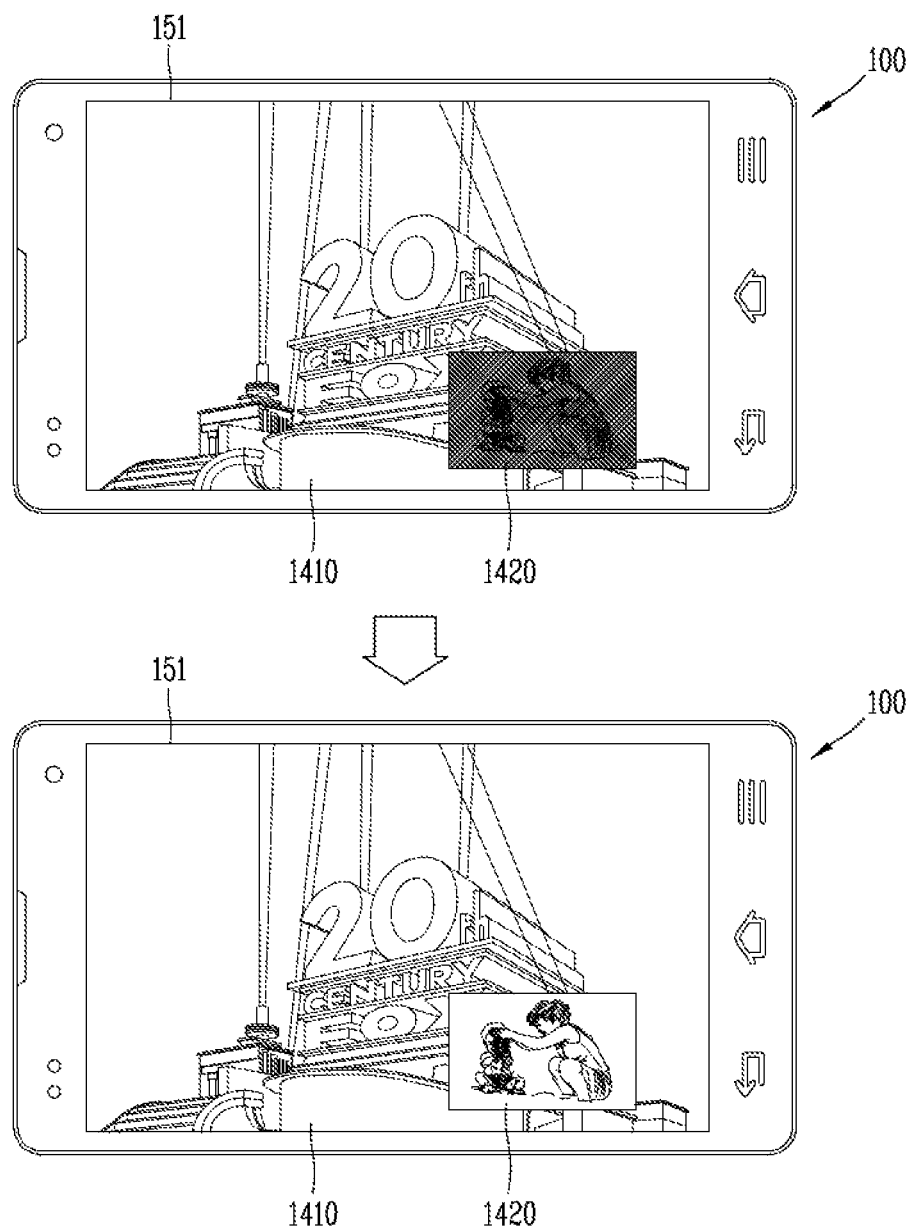
FIG. 14 is a conceptual diagram illustrating an example of the operation of a dual camera in the mobile terminal according to the embodiment of the present invention.

Next, FIG. 14 is a conceptual diagram illustrating an example of the operation of a dual camera in the mobile terminal according to the embodiment of the present invention. Referring to FIG. 14, as the dual camera is put into operation, first and second images 1410 and 1420 may be output to the display unit 151. The dual camera may refer to the ability to activate both the first and second cameras arranged on the terminal body and output the first and second images taken with the first and second cameras, respectively, on the display unit 151.

For the dual camera, the first and second camera face in different directions, and this results in the first and second images having different brightness levels depending on the light source. Accordingly, when the dual camera is executed, the controller 180 can automatically execute the compensation mode and compensate at least one of the first and second images.

For example, the controller 180 can calculate the average luminance values of the first and second images 1410 and 1420, and compensate at least one of the first and second images 1410 and 1420 so that the difference between the average luminance values satisfy limiting criteria. Hereupon, if a save command is received, the controller 180 can save the first and second images, individually, or as a single file. In this instance, the controller 180 can save compensated images as the compensation mode is executed.

As described above, the mobile terminal according to an embodiment of the present invention can automatically compensate image noise caused by light by compensating the image captured by the first camera by using the amount of light entering the first and second cameras. Also, the use of the first and second cameras enables more accurate analysis of the characteristics of the light source, and helps to achieve steady results of shootings, even with various changes in light source.

Moreover, the mobile terminal according to the embodiment of the present invention is capable of providing the best images to the user because image noise, which appears in different forms depending on the location of the light source, can be compensated in various ways by hardware and software. Since the user can make use of auto-compensated images, there is no need to manually change or configure the settings for the camera, thereby improving convenience.

What is claimed is:

1. A mobile terminal comprising:
a wireless communication unit configured to perform wireless communication;

a main body having first and second cameras facing in different directions;
a display unit configured to display an image captured by the first camera; and
a controller configured to:
activate the second camera when an image compensation mode is set on the mobile terminal,
calculate a location of a light source by using images captured by the first and second cameras,
compensate the image based on the calculated location,
display the compensated image on the display unit,
calculate a direction in which noise due to the light source is prevented to the image based on the calculated location, and
display at least one graphics object indicating the direction on the compensated image, wherein the direction is varied based on the calculated location.

2. The mobile terminal of claim 1, wherein the controller is further configured to calculate the location of the light source using an amount of light entering the first and second cameras, and compensate the image based on the calculated location.

3. The mobile terminal of claim 2, wherein the controller is further configured to compensate image noise in the image which appears in different forms depending on the location of the light source.

4. The mobile terminal of claim 3, wherein, if the light source front-lights the first camera, the controller is further configured to compensate a shadow in the image which is cast by the main body.

5. The mobile terminal of claim 3, wherein, if the light source back-lights the first camera, the controller is further configured to detect a region including a human face from the image, and compensate the image so that the detected region has a predetermined brightness level.

6. The mobile terminal of claim 2, wherein the controller is further configured to change a shooting mode of the first camera depending on the calculated location, and compensate the image according to the changed shooting mode.

7. The mobile terminal of claim 6, wherein the shooting mode includes settings associated with at least one of the following: ISO sensitivity, white balance, flash, shutter speed, and aperture.

8. The mobile terminal of claim 2, wherein the controller is further configured to analyze a shooting location using a pattern of an image captured by the second camera and compensate the image by using the amount of light entering the first and second cameras according to the analyzed shooting location.

9. The mobile terminal of claim 8, wherein the controller is further configured to set a scene mode of the first camera to indoors or outdoors according to the analyzed shooting location.

10. The mobile terminal of claim 8, wherein the controller is further configured to analyze a type of the light source using a pattern of the image captured by the second camera and change a white balance of the first camera according to the analyzed type.

11. The mobile terminal of claim 1, wherein, if first and second images captured by the first and second cameras are output to the display unit, the compensation mode is executed, and the controller is further configured to compensate at least one of the first and second images by using an amount of light entering the first and second cameras and output at least one compensated image on the display unit.

12. The mobile terminal of claim 11, wherein the controller is further configured to calculate the average luminance values of the first and second images and compensate at least one of the first and second images so that a difference between the average luminance values satisfy limiting criteria.

13. The mobile terminal of claim 1, wherein, if the first camera is a front camera on the front of the main body, the controller is further configured to execute the compensation mode simultaneously with the activation of the first camera.

14. A method of controlling a mobile terminal including a main body having first and second cameras facing in different directions, the method comprising:
displaying, via a display unit of the mobile terminal, an image captured by the first camera;
activating, via a controller of the mobile terminal, the second camera when an image compensation mode is executed on the mobile terminal;
calculating, via the controller, a location of a light source by using images captured by the first and second cameras;
compensating, via the controller, the image based on the calculated location;
displaying the compensated image on the display unit;
calculating a direction in which noise due to the light source is prevented to the image based on the calculated location; and
displaying at least one graphics object indicating the direction on the compensated image, wherein the direction is varied based on the calculated location.

15. The method of claim 14, further comprising:
calculating a location of a light source using the using an amount of light entering the first and second cameras; and
compensating the image based on the calculated location.

16. The method of claim 15, further comprising:
compensating image noise in the image which appears in different forms depending on the location of the light source.

17. The method of claim 16, further comprising:
compensating a shadow in the image which is cast by the main body, if the light source front-lights the first camera.

18. The method of claim 16, further comprising:
detecting a region including a human face from the image, if the light source back-lights the first camera; and
compensating the image so that the detected region has a predetermined brightness level.

19. The method of claim 15, further comprising:
changing a shooting mode of the first camera depending on the calculated location; and
compensating the image according to the changed shooting mode.

* * * * *